United States Patent [19]
Zefferi et al.

[11] Patent Number: 5,720,902
[45] Date of Patent: Feb. 24, 1998

[54] METHODS AND COMPOSITIONS FOR INHIBITING LOW CARBON STEEL CORROSION

[75] Inventors: Suzanne M. Zefferi, Morrisville; Edward A. Rodzewich, Flourtown, both of Pa.

[73] Assignee: BetzDearborn Inc., Trevose, Pa.

[21] Appl. No.: 531,815

[22] Filed: Sep. 21, 1995

[51] Int. Cl.$^6$ .............................. C09K 3/00; F22B 37/00
[52] U.S. Cl. .................. 252/389.31; 252/389.32; 422/12; 422/13; 422/18; 106/14.05; 106/14.41; 106/14.44; 106/287.11; 106/287.19; 210/698
[58] Field of Search .................. 252/389.31, 389.32; 422/12, 13, 18; 106/14.41, 14.44, 14.05, 287.11, 287.19; 210/698

[56] References Cited

U.S. PATENT DOCUMENTS

| | | | |
|---|---|---|---|
| 4,026,728 | 5/1977 | Yoshida et al. | 148/6.14 R |
| 4,098,758 | 7/1978 | Monte et al. | 260/42.14 |
| 4,195,141 | 3/1980 | Buning et al. | 525/328 |
| 4,339,310 | 7/1982 | Oda et al. | 204/38 R |
| 4,600,789 | 7/1986 | Sugerman et al. | 556/17 |
| 4,634,785 | 1/1987 | Sugerman et al. | 556/17 |
| 5,053,081 | 10/1991 | Jacob | 106/287.11 |
| 5,531,820 | 7/1996 | Gorecki | 106/287.11 |

FOREIGN PATENT DOCUMENTS

| | | | |
|---|---|---|---|
| 2110461 | 7/1994 | Canada | C23F 11/00 |
| 153973 | 9/1985 | European Pat. Off. | |
| 358338 | 8/1989 | European Pat. Off. | |

*Primary Examiner*—Sharon Gibson
*Assistant Examiner*—Deanna Baxam
*Attorney, Agent, or Firm*—Alexander D. Ricci; Philip H. Von Neida

[57] ABSTRACT

Disclosed are methods and compositions for inhibiting the corrosion of low carbon steel in contact with aqueous systems. The composition comprises a silicon compound containing a hydrolyzable group, a complex fluoro acid, and a cross-linking agent.

18 Claims, No Drawings

METHODS AND COMPOSITIONS FOR INHIBITING LOW CARBON STEEL CORROSION

FIELD OF THE INVENTION

The present invention relates to methods and compositions for providing a durable, long lasting chemically resistant corrosion inhibiting film on the surface of low carbon steel.

BACKGROUND OF THE INVENTION

In aqueous systems, particularly industrial aqueous systems, metallic parts need to be protected from corrosion and corrosion byproducts. The metallic parts of these systems which are exposed to the aqueous fluid could include heat exchangers, boilers, pipes, engine jackets, and the like. The cooling fluid contains aggressive ions which are often corrosive towards these metal pads. The introduction of oxidizing substances for biological control will increase the aggressiveness of the cooling fluid toward the metal parts. Corrosion inhibitors are generally added to the aqueous system to prevent metal loss, and pitting.

The use of conventional corrosion inhibitors have certain disadvantages. Chromates are efficacious as corrosion inhibitors, but are known to be very toxic. Zinc has solubility limitations and has also been shown to be toxic to aquatic life. Phosphates and organophosphonates can lead to scale and deposition unless effective deposit control agents are added and well controlled. In addition, phosphorus containing compounds, while not directly toxic to aquatic life, ban promote environmental problems such as eutrophication of surface waters. There currently exists a great need for non-chromate, non-phosphorus corrosion inhibiting treatments.

SUMMARY OF THE INVENTION

The invention relates to methods and compositions of providing a durable, long lasting chemically resistant corrosion inhibiting film on the surface of low carbon steel.

The aqueous compositions are carried to the low carbon steel (LCS) surface via the aqueous media and react with the surface in contact with the aqueous media. Unlike a traditional conversion coating process, the aqueous composition is not necessarily dried and a second coating, such as paint, is not necessarily required.

DESCRIPTION OF THE RELATED ART

U.S. Pat. No. 4,026,728, Yoshida et al., teaches a surface treated steel sheet and strip and process for treating the same. The steel sheet is first treated by forming a corrosion resistant film on the surface of the steel. This first step creates a film by dipping the steel in an aqueous solution of a metal salt of chromium, phosphoros, silicon, cobalt, manganese, copper, nickel, aluminum, or titanium. The sheet is then treated in a second step with an organic silicon compound expressed by the formula $RSiX_3$ to improve adhesion between the base film and the later applied paint layer.

European Patent Application 0 358 338 A2 (EP '338) teaches methods and compositions for creating a protective, anti-corrosion coating on metals such as aluminum and steel. The methods employ a hydrous oxide sol such as zirconia sol which is applied to the metal surface and subsequently cured, thereby creating the protective coating. Optionally, an adhesion promoter designed to increase bond strengths and bond strength retention may also be added to the sol prior to application to the metal surface. The adhesion promoters contemplated include fluorozirconate compounds and silane coupling agents which include fluorozirconic acid and aminoethylaminopropyltrimethoxy silane, respectively.

DETAILED DESCRIPTION OF THE INVENTION

The present invention relates to methods and compositions for inhibiting the corrosion of low carbon steel in contact with an aqueous system comprising adding to said aqueous system a corrosion inhibiting amount of (a) a silicon compound containing a hydrolyzable group, (b) a complex fluoro acid compound, and (c) a cross-linking agent selected from the group consisting of titanate, zirconate, and zircoaluminate compounds.

The silicon compound containing a hydrolyzable group may be selected from the group consisting of silicon compounds having the formula $R_n-Si-X_{(4-n)}$ and silicate compounds. In both instances, these classes of compounds will contain hydrolyzable moieties which will hydrolyze in aqueous solutions to produce reactive silanol groups.

In the formula for the silicon compound, $R_n-Si-X_{(4-n)}$, R is H, $C_1$ to $C_6$ alkyl which may be substituted with a primary or secondary amine, a hydroxy, an epoxy, a vinyl, and a chloroalkyl; or, phenyl, $C_4$ to $C_7$ cycloalkyl or phenyl substituted with an alkyl, a primary or secondary amine, a vinyl or a hydroxy group. X is a hydrolyzable moiety that will hydrolyze in aqueous solution to produce a reactive silanol group and is selected from an alkoxy group and a carboxy group. The alkoxy group includes but is not limited to methoxy, ethoxy, propoxy, butoxy, and pentoxy groups and the carboxy group includes but is not limited to the acetoxy group. n in the formula can be an integer from 1 to 3.

Representative silicate compounds include but are not limited to inorganic silicate compounds such as sodium silicate, lithium silicate and potassium silicate.

Representative silicon compounds containing a hydrolyzable group include aminoethylaminopropyltrimethoxysilane which is commercially available as Z-6020 from Dow Chemical Corporation, vinyltriacetoxysilane and aminopropyltriethoxysilane which are both commercially available from Huls.

The complex fluoro acids should be distinguished from simple fluoro compounds such as hydrofluoric acid, HF. The complex fluoro acid compounds include but are not limited to fluorozirconic acid and fluorotitanic acid.

The titanate compounds are mixed metal oxides. Representative titanate compounds are titanium (IV) his (butyl, methyl) pyrophosphato-o, (adduct) 2 moles 2-N,N-dimethylamino-2-methylpropane, available as KR-158D from Kenrich Petrochemicals, Inc.

The composition can be applied to the low carbon steel by a variety of methods. The combination can be applied by immersion of the low carbon steel or by spraying or flow coating onto the steel surface. However, sufficient contact time between the combination and the steel surface must be made for the treatment to be effective.

The composition is best applied to the steel to be treated as an aqueous solution. It has been found that amounts as low as 10 parts per million parts of each component will form a tenacious film on the low carbon steel. As much as 1000 parts per million of each component can be effectively employed to create the corrosion inhibiting film. Preferably, these amounts range from about 25 to about 500 parts per million.

The composition is most effective in an aqueous system where the pH is acidic. Preferably, the pH of the aqueous system ranges from about 3.0 to about 5.8.

It is anticipated that the methods of the present invention would be effective for corrosion inhibition in cooling applications. The present invention also would eliminate the use of chromium for various treatments and thus is environmentally safer to use.

Although the methods of the present invention inhibit corrosion without other corrosion inhibitors present, they may also be used in conjunction with other additives to inhibit corrosion.

In order to more clearly illustrate this invention, the data set forth below was developed. The following examples are included as being illustrations of the invention and should not be construed as limiting the scope thereof.

BEAKER CORROSION TESTS

The corrosion inhibition activity of the present invention was evaluated with a Beaker Corrosion Test Apparatus (BCTA). The BCTA is composed of a beaker equipped with a LCS coupon, a LCS electrochemical probe, and a stirrer.

Electrochemical corrosion rate data (EC) are obtained during the test. Additional corrosion data is obtained from the coupon and the electrochemical probe by standard weight loss measurement techniques.

Test specimens are exposed to an aqueous solution designed to simulate tap water containing the treatment components. After an appropriate contact time, the specimens are removed from the pretreatment solution and exposed to a testing water, also designed to simulate cooling water. Contact time with the treatment solution can vary from 1 to 90 minutes with the optimum time being 30 minutes.

The following tests were performed to demonstrate the effectiveness of the pretreatment. Low carbon steel probes and coupons were immersed in an aqueous solution containing the treatments from 30 to 60 minutes. Flow was set at 400 rpm's. The probes and coupons were removed from the treatment solutions, then placed in a testing water (test water #1) containing:

| | |
|---|---|
| 60 ppm Ca (as $CaCO_3$) | 33 ppm $SO_4$ |
| 35 ppm Mg (as $CaCO_3$) | 12.5 ppm $SiO_2$ |
| 42 ppm Cl | 83 ppm Na (as $NaHCO_3$) |
| Total Hardness = 95 ppm | pH = 8.4 |

Test water #2 contains:

| | |
|---|---|
| 120 ppm Ca (as $CaCO_3$) | 67 ppm $SO_4$ |
| 70 ppm Mg (as $CaCO_3$) | 83 ppm Na (as $NaHCO_3$) |
| 12.5 ppm $SiO_2$ | Total hardness = 190 ppm |
| 85 ppm Cl | pH = 8.4 |

All test waters contained 1 ppm of hydroxyethylidene diphosphonic acid (HEDP) and 5 ppm of acrylic acid/allyl hydroxy propyl sulfonate copolymer for deposition control. These test results are reported in Table I.

TABLE I

| Treatment (ppm) | Corrosion Rate (mpv*) | Coupon Description |
|---|---|---|
| Test Water #1 | | |
| Z-6040 (50) $H_2ZrF_6$ (25) | 2.31 (5.9) | crevice and pits |
| Z-6040 (50) $H_2ZrF_6$ (50) A (50) | 0.81 (2.4) | clean |
| Z-6040 (50) $H_2ZrF_6$ (50) B (50) | 0.82 (3.4) | clean |
| Z-6030 (50) $H_2ZrF_6$ (50) | 1.47 (4.3) | very few scattered pits |
| Z-6030 (50) $H_2ZrF_6$ (50) A (50) | 0.89 (2.2) | clean |
| Z-6032 (50) $H_2ZrF_6$ (50) B (50) | 1.25 (3.6) | clean |
| Z-6075 (50) $H_2ZrF_6$ (50) A (50) | 0.62 (3.2) | clean |
| Test Water #2 | | |
| N silicate (50) as $SiO_2$ B (50) $H_2ZrF_6$ (50) | 0.54 (1.8) | clean |
| Z-6020 (50) $H_2ZrF_6$ (50) B (50) | 0.61 (1.3) | clean |
| Z-6032 (50) $H_2ZrF_6$ (50) C (50) | 1.34 (2.7) | clean |

N silicate is 3.22 $SiO_2/Na_2O$ sodium silicate available from PQ Corporation.
A is 1 part titanium (IV) (bis-2-propenolato-methyl-1-butanolato, bis (dioctyl) pyrophosphato-o, (adduct) 3 moles N,N-dimethyl amino-alkyl propenoamide with 2 parts of zirconium (IV) 2,2-dimethyl 1,3-propanediolato, bis (dioctyl) pyrophosphato-o, (adduct) 2 moles of N,N-dimethylamino-alkyl propenoamide, available as QB-012 from Kenrich Petrochemicals, Inc.
B is titanium IV bis (butyl, methyl) pyrophosphato-o (adduct) 2 moles 2-N,N-dimethylamino-2-methylpropanol, available as KR-158D from Kenrich Petrochemicals, Inc.
C is mercaptoamine functional zircoaluminate, available as APG-3 from Rhone-Poulenc.
Z-6040 is glycidoxypropyltrimethoxy silane.
Z-6030 is methacryloxypropyltrimethoxy silane.
Z-6032 is N-((2-vinylbenzylamino)-ethyl-3-aminopropyltrimethoxysilane.
Z-6075 is vinyltriacetoxy silane.
Z-6020 is aminoethylaminopropyltrimethoxysilane
Z-6020, 6030, 6032, 6040 and 6075 are available from Dow Chemical Corporation.
*electrochemically measured corrosion rates averaged over 40 hour exposure to test solution
( ) = coupon weight loss data after 40 hours exposure to test solution.

These test results demonstrate that the addition of the cross-linking agent to the silicon compound containing a hydrolyzable group and complex fluoro acid improves low carbon steel corrosion resistance. The inventive compositions resulted in a coupon virtually free of pitting or crevice corrosion. These examples further demonstrate that mixtures of titanates and zirconates were effective in the inventive composition.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the corrosion of low carbon steel in contact with an aqueous system comprising adding to said aqueous system a corrosion inhibiting amount of a combination of (a) a silicon compound containing a hydrolyzeable group having the formula:

$R_n$—Si—$X_{(4-n)}$, wherein R is H, $C_1$ to $C_6$ alkyl, $C_1$ to $C_6$ alkyl substituted with a primary or secondary amine, a hydroxy, an epoxy, a vinyl or a chloroalkyl; or phenyl, $C_4$ to $C_7$ cycloalkyl or phenyl substituted with an alkyl, primary or secondary amine, a vinyl or a hydroxy group; X is a hydrolyzable moiety selected from the group consisting of an alkoxy group and a carboxy group, and n is 1 to 3; or a silicate compound; (b) a complex fluoro acid compound selected from the group consisting of fluorozirconic acid and fluorotitanic acid, and (c) a cross-linking agent selected from the group consisting of titanium(IV)bis(butyl,methyl) pyrophosphato-o, (adduct) 2 moles 2-N,N-dimethylamino-2-methylpropanol; mercaptoamine functional zircoaluminate and a combination of titanium(IV)bis(2-propenolato-methyl)-1-butanolato, bis(dioctyl) pyrophosphato-o,(adduct)3 moles N,N-dimethylamino-alkyl propenoamide and zirconium (IV) 2, 2 dimethyl, 1,3-propanediolato, bis(dioctyl) pyrophosphato-o-, (adduct) 2 moles of N,N-dimethylaminoalkyl propenoamide in a ratio of 1 part titanium (IV) to 2 parts zirconium (IV).

2. The method as claimed in claim 1 wherein X is an alkoxy group selected from the group consisting of a methoxy, ethoxy, propoxy, butoxy, and pentoxy groups or an acetoxy group.

3. The method as claimed in claim 1 wherein said silicon compound is triamino propyltrimethoxy silane.

4. The method as claimed in claim 1 wherein said silicon compound is vinyl trimethoxy silane.

5. The method as claimed in claim 1 wherein said silicon compound is aminoethylaminopropyltrimethoxysilane.

6. The method as claimed in claim 1 wherein said silicate compound is selected from the group consisting of sodium silicate, lithium silicate and potassium silicate.

7. The method as claimed in claim 1 wherein said combination is added to said aqueous system in an amount ranging from 10 parts per million of each compound to about 1000 parts per million parts of each compound.

8. The method as claimed in claim 1 wherein said combination is applied to said low carbon steel by spraying; immersion or flow coating of said combination.

9. The method as claimed in claim 1 wherein said aqueous system is a cooling water system.

10. The method as claimed in claim 1 wherein said combination is added with one or more different corrosion inhibitors.

11. The method as claimed in claim 1 wherein said silicon compound can comprise two or more different silicon compounds.

12. The method as claimed in claim 1 wherein said complex fluoro acid can be one or more complex fluoro acids.

13. A low carbon steel inhibiting composition comprising (a) a silicon compound containing a hydrolyzeable group having the formula:

$R_n$—Si—$X_{(4-n)}$, wherein R is H, $C_1$ to $C_6$ alkyl, $C_1$ to $C_6$ alkyl substituted with a primary or secondary amine, a hydroxy, an epoxy, a vinyl or a chloroalkyl; or phenyl, $C_4$ to $C_7$ cycloalkyl or phenyl substituted with an alkyl, primary or secondary amine, a vinyl or a hydroxy group; X is a hydrolyzable moiety selected from the group consisting of an alkoxy group and a carboxy group, and n is 1 to 3; or a silicate compound; (b) a complex fluoro acid compound selected from the group consisting of fluorozirconic acid and fluorotitanic acid, and (c) a cross-linking agent selected from the group consisting of titanium(IV)bis(butyl, methyl) pyrophosphato-o, (adduct) 2 moles 2-N,N-dimethylamino-2-methylpropanol; mercaptoamine functional zircoaluminate; and a combination of titanium(IV)bis(2-propenolato-methyl)-1-butanolato, bis(dioctyl) pyrophosphato-o,(adduct)3 moles N,N-dimethylamino-alkyl propenoamide and zirconium (IV) 2, 2 dimethyl, 1,3-propanediolato, bis(dioctyl) pyrophosphato-o, (adduct) 2 moles of N,N-dimethylaminoalkyl propenoamide in a ratio of 1 part titanium (IV) to 2 parts zirconium (IV).

14. The composition as claimed in claim 13 wherein X is an alkoxy group selected from the group consisting of a methoxy, ethoxy, propoxy, butoxy, and pentoxy groups or an acetoxy group.

15. The composition as claimed in claim 13 wherein said silicon compound is triamino propyltrimethoxy silane.

16. The composition as claimed in claim 13 wherein said silicon compound is vinyl trimethoxy silane.

17. The composition as claimed in claim 13 wherein said silicon compound is aminoethylaminopropyltrimethoxysilane.

18. The composition as claimed in claim 13 wherein said silicate compound is selected from the group consisting of sodium silicate, lithium silicate and potassium silicate.

* * * * *